US008643711B2

United States Patent
Ganser et al.

(10) Patent No.: US 8,643,711 B2
(45) Date of Patent: Feb. 4, 2014

(54) MICROSCOPE COMPRISING A CAMERA CONNECTION AND A CAMERA ADAPTER

(75) Inventors: Michael Ganser, Giessen (DE); Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1105 days.

(21) Appl. No.: 12/300,108

(22) PCT Filed: Mar. 28, 2007

(86) PCT No.: PCT/EP2007/052987
§ 371 (c)(1),
(2), (4) Date: Nov. 7, 2008

(87) PCT Pub. No.: WO2007/131832
PCT Pub. Date: Nov. 22, 2007

(65) Prior Publication Data
US 2009/0195646 A1    Aug. 6, 2009

(30) Foreign Application Priority Data

May 11, 2006   (DE) .......................... 10 2006 022 276

(51) Int. Cl.
*H04N 7/18* (2006.01)
*H04N 5/225* (2006.01)

(52) U.S. Cl.
USPC .............................. 348/79; 348/373; 348/375

(58) Field of Classification Search
USPC ........................................... 348/79, 373, 375
See application file for complete search history.

(56) References Cited

U.S. PATENT DOCUMENTS

| 6,657,787 B1 | 12/2003 | Otaki |
| 6,741,394 B1 * | 5/2004 | Tanitsu et al. ................. 359/619 |
| 7,079,316 B2 * | 7/2006 | Weiss et al. .................. 359/386 |
| 7,436,449 B2 * | 10/2008 | Mihara ......................... 348/362 |
| 2002/0030883 A1 * | 3/2002 | Adachi et al. ................. 359/368 |

FOREIGN PATENT DOCUMENTS

| DE | 296 04 667 | 10/1996 |
| DE | 202 12 456 | 11/2002 |
| DE | 10 2004 049 275 | 4/2006 |
| DE | 10 2006 022 276 | 11/2007 |
| EP | 1 533 644 | 5/2005 |
| EP | 1 538 471 | 6/2005 |
| WO | 2004 023185 | 3/2004 |

OTHER PUBLICATIONS

Notification of Transmittal of Translation of the International Preliminary Report of Patentability from the International Bureau dated Dec. 24, 2008.

* cited by examiner

*Primary Examiner* — Aaron Strange
(74) *Attorney, Agent, or Firm* — Schlee IP International, P.C.; Alexander R. Schlee

(57) ABSTRACT

A microscope comprising a camera connection in a image beam path is suggested. A camera adapter and a camera can be adapted to the camera connection, and the microscope can be used to reproduce the image of a sample on a sensor of the camera. Imaging of the beam path in the camera adapter comprises an intermediate imaging with a pupil plane having reduced beam diameter next to the pupil plane, and at least one optical means can be inserted into the reproduction beam path in the region of the reduced beam cross-section. An optical means or an interchangeable device comprising a plurality of optical means, such as filters, plane-parallel plates or wedge plate, is integrated into the pupil plane in the camera adapter.

12 Claims, 1 Drawing Sheet

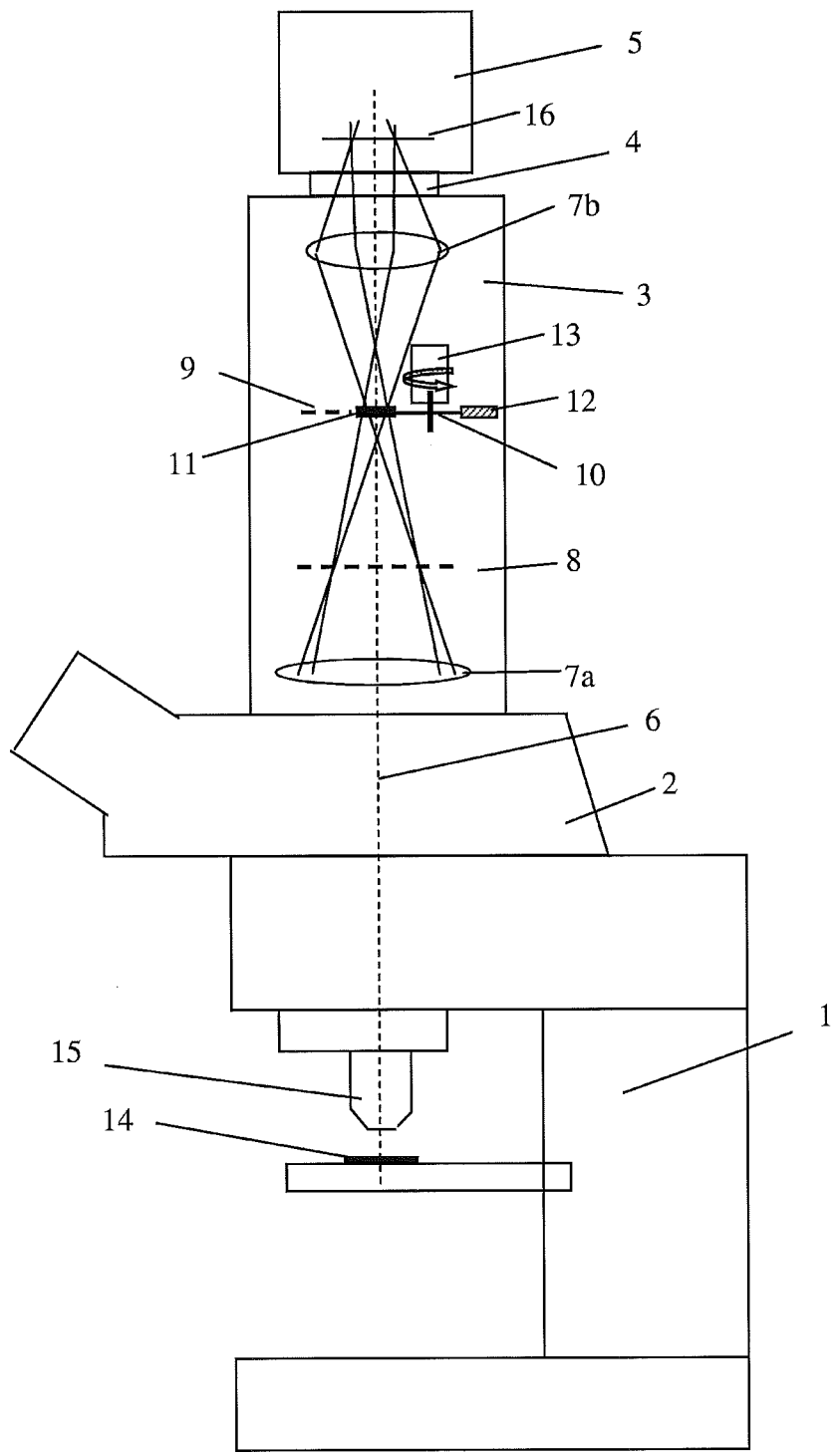

MICROSCOPE COMPRISING A CAMERA CONNECTION AND A CAMERA ADAPTER

CROSS REFERENCE TO RELATED APPLICATIONS

This application is a national phase of the International Patent Application PCT/EP2007/052987 filed on Mar. 28, 2007 that claims the priority from the German patent application 10 2006 022 276.8 dated May 11, 2006.

BACKGROUND OF THE INVENTION

The invention relates to a microscope with a camera connection and an image beam path, wherein the camera connection is connected to a camera adapter and a camera and wherein the image of the object can be imaged onto a sensor of the camera. The invention further relates to a camera adapter for a microscope with a camera connection provided in an image beam path, wherein the camera adapter with a camera is connected to the camera connection and wherein the image of the object can be imaged onto a sensor of the camera.

It is known to set on top of such a camera connection of such a microscope a camera adapter and thereon a camera. The connection between the camera adapter and the camera provides a standardized mechanical interface, known as C-mount interface.

Between the camera adapter and the camera it is possible to provide additionally a separate filter interchanger with several filters by means of additional C-mount interfaces allowing to insert filters as desired into the image beam path. Such filter interchangers are available on the market (for example from the company Optical Insights, Tucson, Ariz., U.S.A. under the name Extender™). By means of the additionally required C-mount interfaces and the dimensions of the filter interchanger that is attached as a separate part at the microscope or the camera adapter, the overall height of the microscope is very high. Due to the size of the filters that need to cover the entire cross section of the beam, the filters and therefore the filter interchangers are relatively heavy. Since the filter interchanger is heavy and subject to high inertial forces, an accordingly long switching time for the change between two filters results.

SUMMARY OF THE INVENTION

Therefore, it is an object of the invention to create a microscope with a camera connection and a camera adapter for such a microscope comprising a more compact design of the entire system including camera and filters.

According to the invention, a microscope with a camera connection and an image beam path, wherein the camera connection is connected to a camera adapter and a camera and wherein the image of an object can be imaged onto a sensor of the camera, is characterized by the following features:
that the image beam path comprises within the camera adapter of the microscope an intermediate image in a pupil plane where the beam path comprises a reduced beam diameter,
and that at least one optical means is insertable in the area of the reduced beam diameter into the camera adapter.
The image beam path of the microscope is therefore structured such that an intermediate image with a pupil plane is provided within the camera adapter. Therefore, a significantly reduced beam diameter is created in the pupil plane and in a small area adjacent to the pupil plane into that an optical means is inserted.

A camera adapter according to the invention for a microscope that is provided with a camera connection in an image beam path is characterized in that,
the image beam path comprises within the camera adapter of the microscope an intermediate image in a pupil plane where the beam path comprises a reduced beam diameter,
and that at least one optical means is insertable in the area of the reduced beam diameter into the camera adapter.

Such a camera adapter creates an intermediate image with a pupil plane. In this pupil plane, a very small beam diameter is present, for example smaller than 5 mm. This small beam cross section allows inserting small filters or integrating an interchanging device carrying several optical means into the camera adapter. The camera adapter can comprise a C-mount interface in the direction of the side of the camera.

According to a specific embodiment the camera adapter can be adapted to various pupil planes, for example in case of various beam paths in different microscopes. Such a camera adapter comprises for the purpose of adapting to any position of the pupil plane at least one additional optical imaging means that can adjust the position of the pupil plane such that it coincides with the position of the optical means and of the interchanging means, respectively. This allows to correct any pupil plane that deviates from the inserting area of the optical means by shifting the pupil plane into the inserting area of the optical means and the interchanging means, respectively.

The filter and the interchanging means are provided in the pupil plane or, due to the 3-dimensional size of the optical means or the interchanging means, in an area closely adjacent to the pupil plane where a significantly reduced beam diameter of the optical beam path is present. This allows the use of very small filters with low mass. Due to the low inertial forces this allows a very fast switching of the interchanging means.

The interchanging means that may carry several optical means is integrated into the camera adapter. Use of optical means, for instance filters, that are of the same thickness provides the advantage that deviations in the depth of focus are avoided when switching between the various optical means. A permanent or a modifiable loading of the interchanging means with optical means is possible. In the latter case, the customer himself can change loading of the interchanging means with the various optical means.

It is possible to design the interchanging means as a linear slider. By means of the linear shifting of the linear slider a chosen optical means can be inserted into the optical beam path. The interchanging means can be designed as a turning disk. In this case, a chosen optical means is inserted by a respective rotation of the turning disk into the optical beam path.

Actuating the interchanging means can be accomplished manually as well as driven by a motor, for example by means of a controlled stepping motor or synchronous motor. In this case, triggering and synchronizing, respectively, of the camera image and the control of the interchanging means is possible. The interchanging means can be mounted permanently into the camera adapter. In the alternative, the camera adapter can be designed in a way that the interchanging means is inserted detachably into the camera adapter. For this purpose, the camera adapter is provided with a receiving assembly in the pupil plane for receiving an interchanging means, for example filter disk shifter, carrying the filter disk with the filters and a powered drive unit (for example a stepping motor or a drive unit comprising a toothed belt).

The optical means can for example be a filter, for instance a spectral filter, a neutral filter or a controllable liquid crystal filter.

Moreover, designing the optical means as a plate with parallel faces is possible. In this case, the plate with parallel faces may have a defined thickness achieving a predetermined focus position change in the object in comparison to the position of the focus without inserted plate with parallel faces. In this manner an image can be imaged in a defined z-plane that would not be imaged without the plate having parallel faces inserted into the image beam path. By positioning a plurality of plane-parallel plates having different thicknesses on an interchanging means a quick focusing in the various focal planes, referring to z-positions, within the object is accomplished. This is for instance helpful in case of transparent or semitransparent objects or objects having a structured or oblique surface. By switching the interchanging means an interchanging between plates with parallel faces having various thicknesses is achieved so that a quick focusing-through in predetermined steps is possible.

The optical means can also be designed as a diaphragm restricting the diameter of the imaging beam path. A variety of diaphragms provided on the interchanging means allows to restrict or widen stepwise in a quick and convenient manner the cross section of the imaging beam path. Moreover, the optical means can be designed as an optical wedge plate having a wedge angle. In addition, the optical wedge plate may have the properties of a spectral filter or a neutral filter. The wedge angle of the optical wedge plate creates a defined lateral offset of the image of the object on the sensor of the camera.

In special embodiments this allows use as a high resolution module. For this purpose, at two positions of the interchanging means a suitable optical wedge plate is mounted, respectively. Each one of the optical wedge plates effects an offset of the microscope image on the camera sensor by the size of one pixel (for example 7 μm). In one position of the interchanging means the image is shifted by one pixel in x-direction, and in a different position shifted by one pixel in the y-direction. This allows to detect each pixel with the three colors of the Bayer matrix enhancing the resolution by a factor 2. Due to the very short shifting time of the small and lightweight interchanging means that is integrated into the camera adapter a picture of higher resolution (for example for the purpose of documentation) can be shot very quickly.

In the following, the invention is discussed by referring to an example and the schematic FIG. 1.

BRIEF DESCRIPTION OF THE DRAWINGS

FIG. 1 shows a microscope 1 with a tube 2 carrying a camera adapter 3 on top. On top of that, a camera 5 is positioned by means of a C-mount interface.

DETAILED DESCRIPTION OF THE DRAWINGS

A schematically shown beam path extending along an optical axis 6 comprises as a first image forming lens system a first lens 7a and a second lens 7b. In the image beam path, an intermediate image plane 8 and a pupil plane 9 are provided.

Therefore, there is a significantly reduced beam diameter in the area of the pupil plane within the camera adapter where optical means can be positioned. In this embodiment, an interchanging means 10 is provided that is designed as a filter turret. The interchanging means 10 carries a first filter 11 that is pivoted into the beam path, and a second filter 12 that has been pivoted out of the beam path. The movement of interchanging means 10 is accomplished by a motor 13 providing rotation around a motor axis. The rotation is depicted by an arrow. The low weight of the filter 11, 12 and of the interchanging means 10 allows fast switching action. This allows in addition synchronizing with the camera shooting, for instance triggering of a camera shooting with the switching signal or triggering of the switching action with the shooting signal of the camera.

Via the image beam path an object 14 is imaged through the objectively into the image plane 16 that is positioned on the sensor of the camera 5.

The very small beam cross section of the image beam path in the pupil plane or closely adjacent to the pupil plane allows using very small filters 11, 12. Accordingly, also the interchanging means 10 and the driving unit comprising the motor 13 can be very small. This results in a very compact design of the camera adapter 3 although the interchanging means 10 is integrated therein. The overall assembly of the microscope 1 with the camera adapter 3 and the camera 5 placed on top is significantly lower and more compact than in the prior art designs that required a separate filter interchanging means and several C-mount interfaces.

LIST OF REFERENCE NUMERALS 1. microscope
2. tube
3. camera adapter
4. C-mount interface
5. camera
6. optical axis
7. a first lens
   b second lens
8. intermediate image plane
9. pupil plane
10. interchanging means, here: filter turret
11. filter in the beam path
12. filter pivoted out
13. motor
14. object
15. objective
16. image plane This invention claimed is:

1. A camera adapter for a microscope; wherein
   the camera adapter is connectable to a camera connection of the microscope;
   the camera adapter is provided with an integrated interchanger for interchanging at least two optical elements against each other;
   an image beam path of the microscope extends such within the camera adapter that an intermediate image in a pupil plane is created where the beam path comprises a reduced beam diameter; and
   the interchanger is provided at a location where it interchanges the at least two optical elements against each other to insert these optical elements in the area of the reduced beam diameter; and
   for adapting to arbitrary positions of the pupil plane at least one additional optical imager is provided allowing correction for any position of the pupil plane deviating from the inserting area of the optical elements by shifting the pupil plane into the inserting area.

2. Camera adapter according to claim 1, wherein at least one of the optical elements is designed as a spectral filter, a neutral filter or a controllable liquid crystal filter.

3. Camera adapter according to claim 1, wherein at least one of the optical elements is designed as a plane-parallel plate with parallel faces.

4. Camera adapter according to claim 3, wherein the plane-parallel plate comprises a defined thickness allowing to generate an image of a defined z-plane of an object, wherein said z-plane would otherwise not be imaged without the plane-parallel plate provided in the image beam path.

5. Camera adapter according to claim 1, wherein at least one of the optical elements is designed as an optical wedge plate having a wedge angle effecting a defined lateral offset of the image of the object on the sensor of the camera.

6. Camera adapter according to claim 5, wherein the optical wedge plate is additionally designed as a spectral filter or a neutral filter.

7. Camera adapter according to claim 1, wherein at least one of the optical elements is designed as a diaphragm restricting the diameter of the image beam path.

8. Camera adapter according to claim 1, wherein the interchanger is designed as a linear slider adapted to linearly shift an optical elements into the image beam path.

9. Camera adapter according to claim 1, wherein the interchanger is designed as a turning disk adapted to insert a chosen optical element into the image beam path by rotation of the turning disk.

10. Camera adapter according to claim 1, wherein the interchanger is mounted in a permanent manner into the camera adapter.

11. Camera adapter according to claim 1, wherein the interchanger is detachably mounted within the camera adapter.

12. Camera adapter according to claim 1, wherein reversible insertion of the interchanger can be accomplished by motor or manually.

* * * * *